United States Patent
Chang et al.

(10) Patent No.: US 11,035,687 B2
(45) Date of Patent: *Jun. 15, 2021

(54) VIRTUAL BREADCRUMBS FOR INDOOR LOCATION WAYFINDING

(71) Applicant: Intel Corporation, Santa Clara, CA (US)

(72) Inventors: Sherry D. Chang, El Dorado Hills, CA (US); Charles Baron, Chandler, AZ (US); Oliver W. Chen, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,959

(22) Filed: Nov. 28, 2017

(65) Prior Publication Data

US 2018/0180433 A1 Jun. 28, 2018

Related U.S. Application Data

(63) Continuation of application No. 14/355,282, filed as application No. PCT/US2013/067729 on Oct. 31, 2013, now Pat. No. 9,829,335.

(30) Foreign Application Priority Data

Oct. 31, 2013 (WO) ................ PCT/US2013/067729

(51) Int. Cl.
*G01C 21/36* (2006.01)
*H04W 4/02* (2018.01)
(Continued)

(52) U.S. Cl.
CPC ........... *G01C 21/36* (2013.01); *G01C 21/206* (2013.01); *G01S 5/0263* (2013.01);
(Continued)

(58) Field of Classification Search
CPC ...... G01C 21/36; G01C 21/206; G01C 21/14; H04W 4/024; H04W 4/33; H04W 4/026; H04W 4/029; H04W 4/027
(Continued)

(56) References Cited

U.S. PATENT DOCUMENTS 7,411,518 B2 * 8/2008 Ratnakar ................ G08B 21/24
340/932.2
9,829,335 B2 * 11/2017 Chang ................... G01S 5/0263
(Continued)

FOREIGN PATENT DOCUMENTS

WO 2008005795 A1 1/2008

OTHER PUBLICATIONS

First Office Action dated Jun. 28, 2018 for Chinese Patent Application No. 201380080008.7, 10 pages.
(Continued)

*Primary Examiner* — Nadeem Odeh
(74) *Attorney, Agent, or Firm* — Hanley, Flight & Zimmerman

(57) ABSTRACT

Technologies for directional wayfinding include a mobile computing device having one or more local location sensors to generate data indicative of movement of the mobile computing device. The mobile computing device captures first sensor data indicative of movement of the mobile computing device along a path and determines a series of waypoints based on the first sensor data. The waypoints may describe movement data of the mobile computing device, including length and direction of movement. The mobile computing device determines a series of directional instructions to guide a user of the mobile computing device back along the path in the reverse order and presents the directional instructions to the user. The mobile computing device may monitor the sensor data to determine whether the user
(Continued)

has arrived at each waypoint while reversing the path. The sensors may include an accelerometer, gyroscope, magnetometer, or altimeter. Other embodiments are described and claimed.

12 Claims, 4 Drawing Sheets

(51) Int. Cl.
    *H04W 4/024*     (2018.01)
    *H04W 4/33*     (2018.01)
    *H04W 64/00*     (2009.01)
    *G01S 5/02*     (2010.01)
    *G01C 21/20*     (2006.01)
    *H04W 4/029*     (2018.01)
    *H04M 1/72454*     (2021.01)
    *H04M 1/72457*     (2021.01)
    *H04W 4/44*     (2018.01)

(52) U.S. Cl.
    CPC ... *H04M 1/72454* (2021.01); *H04M 1/72457* (2021.01); *H04W 4/024* (2018.02); *H04W 4/026* (2013.01); *H04W 4/027* (2013.01); *H04W 4/029* (2018.02); *H04W 4/33* (2018.02); *H04W 4/44* (2018.02); *H04W 64/006* (2013.01); *H04M 2250/12* (2013.01)

(58) Field of Classification Search
    USPC .......................................................... 701/467
    See application file for complete search history.

(56) References Cited

U.S. PATENT DOCUMENTS

| | | |
|---|---|---|
| 2007/0030121 A1 | 2/2007 | Soliz |
| 2009/0058685 A1* | 3/2009 | Mc Call ................ G08G 1/005 340/995.24 |
| 2010/0318293 A1 | 12/2010 | Brush et al. |
| 2014/0129175 A1* | 5/2014 | Poduri ................ G01C 22/006 702/141 |

OTHER PUBLICATIONS

Second Office action in Chinese patent application No. 201380080008.7, dated Mar. 4, 2019 (20 pages).

\* cited by examiner

| # | Waypoint | Sensor(s) |
|---|---|---|
| 402 | Start | -- |
| 404 | 20 steps N | Accelerometer, Magnetometer |
| 406 | Turn E | Magnetometer, Gyroscope |
| 408 | 10 steps E | Accelerometer, Magnetometer, Signal Strength |
| 410 | Up 1 flight | Altimeter, Accelerometer |
| 412 | "Past the statue" | Camera, Audio Sensor |
| 414 | 5 steps N | Accelerometer, Magnetometer |
| 416 | Destination | -- |

VIRTUAL BREADCRUMBS FOR INDOOR LOCATION WAYFINDING

CROSS-REFERENCE TO RELATED APPLICATIONS

The present application is a continuation of U.S. patent application Ser. No. 14/355,282, entitled "VIRTUAL BREADCRUMBS FOR INDOOR LOCATION WAYFINDING," which was filed Apr. 30, 2014, and which is a national stage entry under 35 U.S.C. § 371(b) of International Application No. PCT/US2013/067729, which was filed on Oct. 31, 2013.

BACKGROUND

Location and directional services are popular applications for mobile computing devices such as smartphones, tablets, and portable computers. Typical directional services provide outdoor driving or walking directions between locations, using a global positioning system (GPS) receiver on the mobile device and referencing detailed map data maintained on a remote server. Thus, typical mapping solutions require network and/or GPS connectivity. Additionally, the location and movement of the mobile device may be tracked by the remote server.

Typical mapping databases provide detailed views of outdoor spaces. However, details of indoor locations, including large buildings such as convention halls, shopping malls, or government buildings, are typically not included in such mapping databases. Many private building owners do not provide details on the internal layout of their buildings to third-party map providers for security, privacy, or competitive reasons. Also, network connectivity may be unavailable or spotty for mobile devices within indoor locations, and GPS signals may be weak within some indoor locations. Thus, even when an indoor location is included in mapping data, location or directional services may not be available to a mobile device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
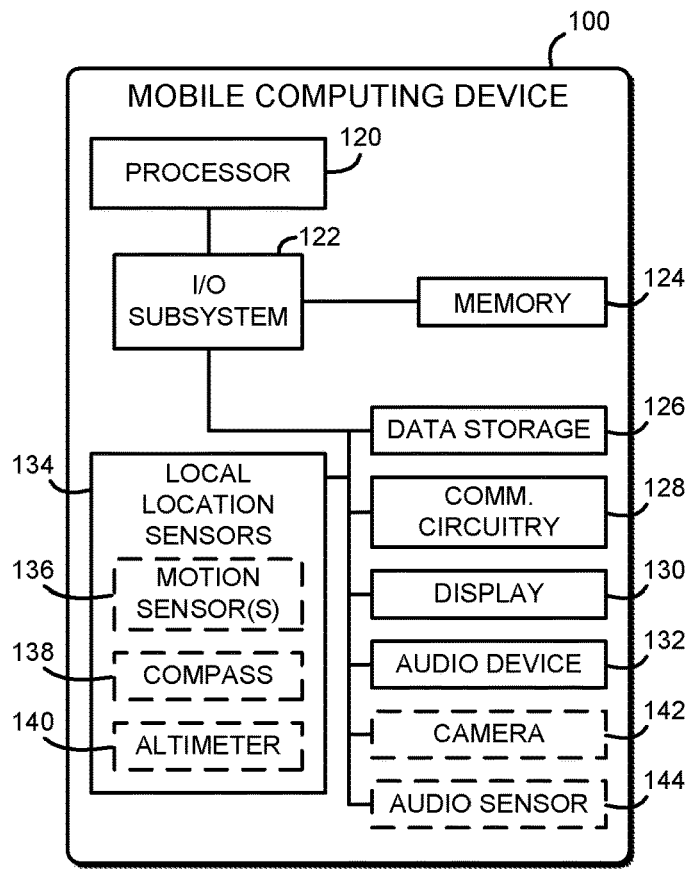
FIG. 1 is a simplified block diagram of at least one embodiment of a mobile computing device for indoor location wayfinding.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative mobile computing device 100 may be used for indoor location wayfinding. When arriving at an unfamiliar location a user of the mobile computing device 100 may command the device to start recording a path. For example, the user may start recording the path at the user's parking spot within an underground garage. As the user travels through the indoor location—carrying the mobile computing device 100—the mobile computing device 100 monitors data from a number of local sensors and translates the sensor data into a series of waypoints along the path. Each waypoint defines movement data relative to the previous waypoint (e.g., number of steps or relative distance in a particular direction). Upon reaching the destination, the user may command the device 100 to stop recording the path. When ready to return, the user may command the mobile computing device 100 to provide directions back to the starting point. The mobile computing device 100 translates the waypoints along the path into a series of directional instructions to guide the user along the path in the reverse direction back to the starting point. The mobile computing device 100 monitors the sensors along the way, and presents the directional instructions in turn as the user reaches each waypoint. By collecting waypoints and generating directional instructions based on sensor data, the mobile computing device 100 may guide the user without relying on an external mapping server, GPS data, or any other remote service. Thus, a mobile computing device 100 according to this disclosure may be useable for indoor locations not included in mapping databases or having limited or no network or GPS connectivity. For example, the mobile computing device 100 may be used at secure locations where access to outside servers is restricted. Additionally, because no remote server is required, there may be reduced opportunity for the location of the mobile computing device 100 to be tracked and thus user privacy may be improved. Further, although the disclosed technologies are described as useful for indoor wayfinding, it should be understood that this disclosure is equally applicable to outdoor wayfinding. For example, this disclosure may be used for locating an outdoor point of interest or a hidden object such as a geocache.

The mobile computing device 100 may be embodied as any type of device for performing the functions described herein. For example, the mobile computing device 100 may be embodied as, without limitation, a smart phone, a tablet computer, a smart watch, smart eyeglasses, a laptop computer, a notebook computer, a mobile computing device, a cellular telephone, a handset, a messaging device, a wearable computing device, a vehicle telematics device, a distributed computing system, a multiprocessor system, a consumer electronic device, and/or any other computing device configured to perform the functions described herein. As shown in FIG. 1, the illustrative mobile computing device 100 includes a processor 120, an input/output subsystem 122, a memory 124, and a data storage device 126. Of course, the mobile computing device 100 may include other or additional components, such as those commonly found in a portable computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may be used to record wayfinding information, including sensor data, path information, and recorded user reminders such as images and audio clips.

The mobile computing device 100 further includes a communication circuit 128, which may be embodied as any communication circuit, device, or collection thereof, capable of enabling communications between the mobile computing device 100 and remote computing devices. The communication circuit 128 may be configured to use any one or more communication technology (e.g., wireless or wired communications) and associated protocols (e.g., Ethernet, Bluetooth®, Wi-Fi®, WiMAX, HSPA+, LTE, etc.) to effect such communication. The communication circuit 128 may be embodied as a network adapter, including a wireless network adapter. The communication circuit 128 may be capable of determining a wireless signal strength associated with one or more base stations, such as wireless access points or cell towers.

The mobile computing device 100 further includes a display 130 and an audio device 132. The display 130 of the mobile computing device 100 may be embodied as any type of display capable of displaying digital information such as a liquid crystal display (LCD), a light emitting diode (LED), a plasma display, a cathode ray tube (CRT), or other type of display device. In some embodiments, the display 130 may be coupled to a touch screen to receive user input. The audio device 132 may be embodied as any device capable of generating audio signals for output, such as a paper cone speaker, an audio transducer, an audio output jack, a digital-to-analog converter (DAC), or other type of audio device.

The mobile computing device 100 further includes a number of local location sensors 134. Each local location sensor 134 may be embodied as any sensor capable of generating sensor data indicative of the movement of the mobile computing device 100, without relying on interaction (e.g., communication) with a device other than the mobile computing device 100 itself. For example, the local location sensors 134 may include one or more motion sensor(s) 136, a magnetic compass 138, and/or an altimeter 140. However, the local location sensors 134 does not include global positioning system (GPS) circuitry, for example, as GPS relies on receiving signals from other devices, particularly GPS satellites. The mobile computing device 100 may include all or any combination of local location sensors 134. In some embodiments, some or all of the local location sensors 134 may be selectively enabled or disabled by the user of the mobile computing device 100. For example, the user may generate a privacy policy to specify the enabled or disabled local location sensors 134.

The motion sensor(s) 136 may be embodied as one or more of any sensor capable of sensing motion of the mobile computing device 100 including, for example, one or more accelerometers, gyroscopes or any other type of device or devices capable of detecting device motion. For example, the motion sensor(s) 138 may include a three-axis accelerometer and a three-axis gyroscope, allowing motion tracking in three linear dimensions and about three rotational axes. Because the mobile computing device 100 may typically be carried by the user, motion detected by the motion sensor(s) 136 may correspond to motion of the user, such as footsteps.

The compass 138 may be embodied as any device capable of determining the geographic orientation of the mobile computing device 100. For example, the compass 138 may be embodied as a magnetometer, and the orientation of the mobile computing device 100 may be determined through detection of the Earth's magnetic field.

The altimeter 140 may be embodied as any device capable of determining the elevation or relative elevation of the mobile computing device 100. For example, the altimeter 140 may be an air pressure sensor that is capable of determining altitude based on changes in air pressure. The data generated by the altimeter 140 may be precise enough to determine an indoor floor or level of the user; that is, the altimeter 140 may provide altitude data with precision on the order of about ten feet, at least.

The mobile computing device 100 may further include a camera 142 and/or an audio sensor 144 in some embodiments. The camera 142 may be embodied as a digital camera or other digital imaging device integrated with the mobile computing device 100. The camera 142 includes an electronic image sensor, such as an active-pixel sensor (APS), e.g., a complementary metal-oxide-semiconductor (CMOS) sensor, or a charge-coupled device (CCD). The audio sensor 144 may be embodied as any sensor capable of capturing audio signals such as a microphone, a line input jack and associated circuitry, an analog-to-digital converter (ADC), or other type of audio sensor. The camera 142 and/or the audio sensor 144 may be used by the mobile computing device 100 to capture user reminders, as described below.

Figure 2:
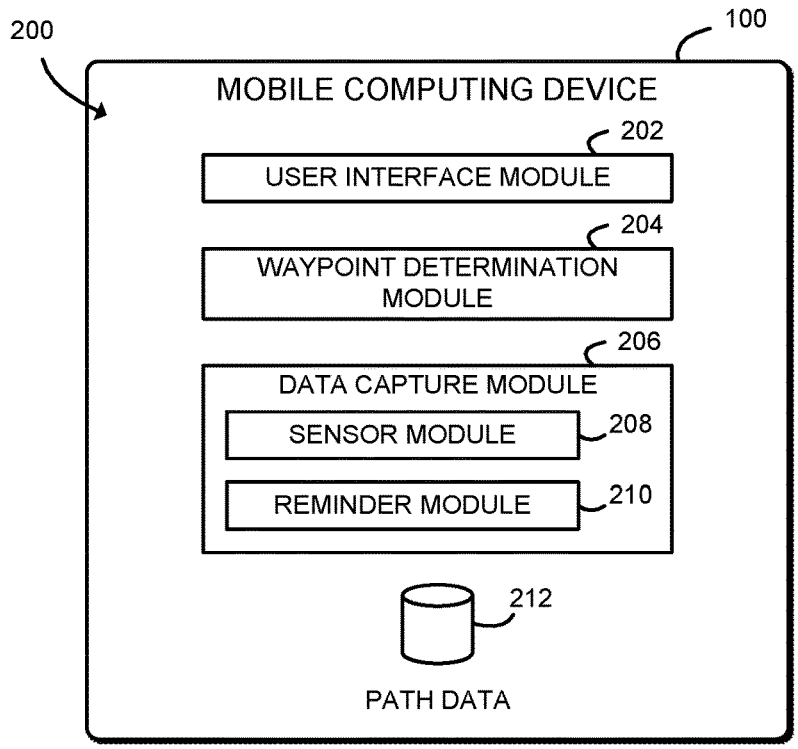
FIG. 2 is a simplified block diagram of at least one embodiment of an environment of the mobile computing device of FIG. 1.

Referring now to FIG. 2, in the illustrative embodiment, the mobile computing device 100 establishes an environment 200 during operation. The illustrative environment 200 includes a user interface module 202, a waypoint determination module 204, and a data capture module 206. The various modules of the environment 200 may be embodied as hardware, firmware, software, or a combination thereof.

The data capture module 206 is configured to receive sensor data from the local location sensors 134 that describes the movement of the mobile computing device 100. The data capture module 206 receives data both while recording the path from the starting point to the ending point and while guiding the user back to the starting point. The data capture module 206 is also configured to capture user reminders such as digital images, voice recordings, or other user-generated directional information. In some embodiments, those functions may be performed by one or more sub-modules, for example by a sensor module 208 or a reminder module 210.

The waypoint determination module 204 is configured to determine waypoints along the user's path based on the sensor data captured by the data capture module 206. The waypoint determination module 204 processes the raw sensor data to determine usable directional information, such as distance traveled, direction of travel, or elevation changes. For example, the waypoint determination module 204 may process accelerometer data to count a user's footsteps, similar to a dedicated pedometer. The waypoint determination module 204 may store the generated directional information in the path data 212 as a number of waypoints. The waypoint determination module 204 is also configured to reverse the waypoints to determine directional instructions to guide the user to each waypoint in a reverse direction from the ending point back to the starting point.

The user interface module 202 is configured to allow the user to start and stop recording a path, and to start guiding the user back to the starting point. While guiding the user back to the starting point, the user interface module 202 is configured to present directional instructions to the user. The user interface module 202 may use any user interface mode available on the mobile computing device 100. For example, the user interface module 202 may generate a graphical interface on the display 130, generate spoken instructions using the audio device 132, or use any combination of user interface modes.

The path data 212 stores an ordered list of waypoints describing the path of the mobile computing device 100. The path data 212 may store the waypoints as relative directional information in terms of distance traveled, direction of travel, and elevation changes. Additionally or alternatively, the path data 212 may store the waypoints as raw sensor data received by the local location sensors 134. In some embodiments, the path data 212 may also store user-generated reminders. As described above, the path data 212 may be used by the waypoint determination module 204 to generate directional instructions that guide the user through the waypoints in the reverse direction.

Figure 3A:
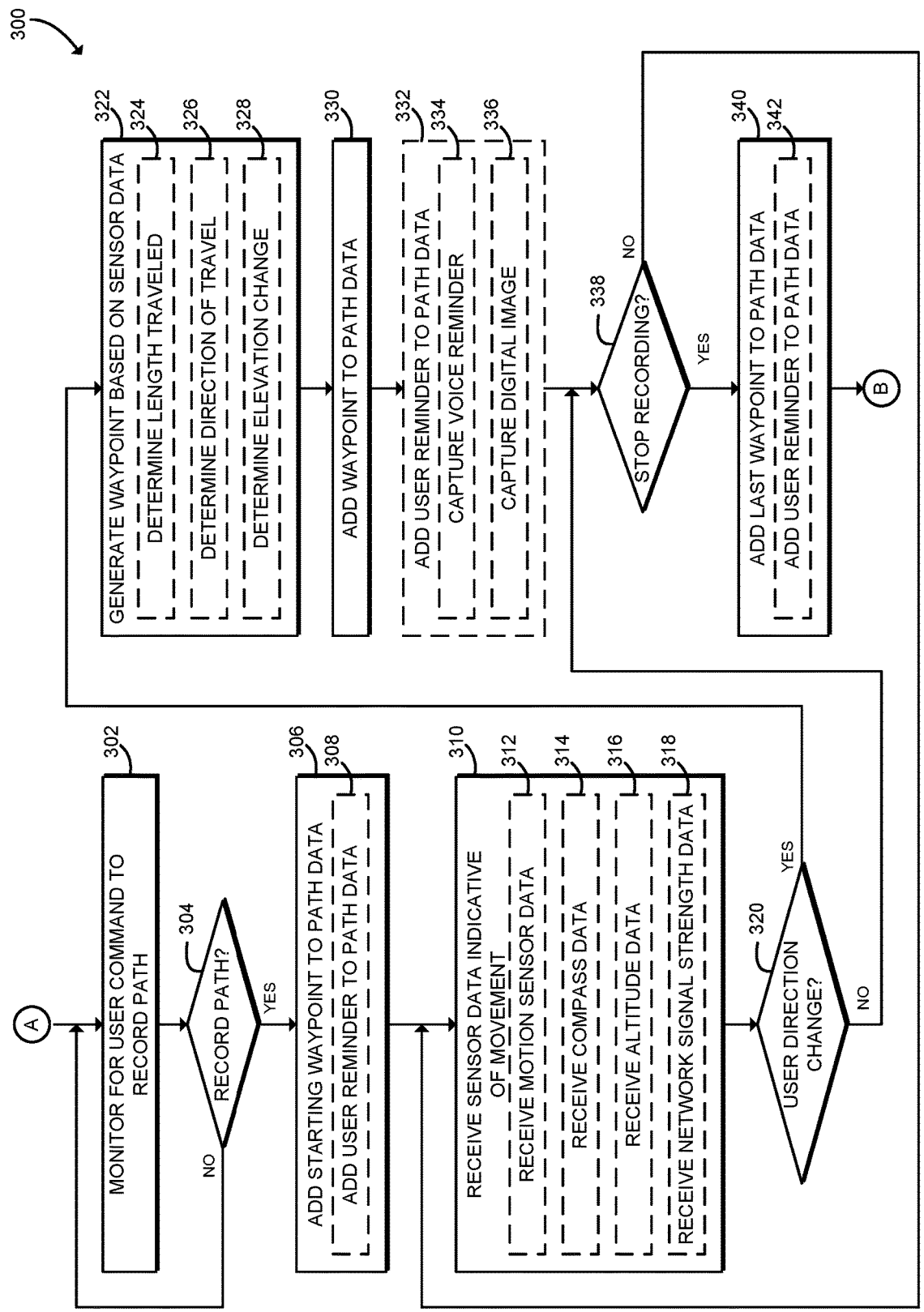
FIGS. 3A and 3B are a simplified flow diagram of at least one embodiment of a method for indoor location wayfinding that may be executed by the mobile computing device of FIGS. 1 and 2.

Referring now to FIG. 3A, in use, the mobile computing device 100 may execute a method 300 for indoor location wayfinding. The method 300 begins in block 302, in which the mobile computing device 100 monitors for a command from the user to record a path. The user may command the mobile computing device 100 through any mode of interaction. For example, the user may interact with touch screen controls on the display 130 of the mobile computing device 100, or utter a spoken command to the mobile computing device 100. In block 304, the mobile computing device 100 determines whether a command to record the path has been received. If not, the method 300 loops back to block 302 to continue monitoring for user commands. If the mobile computing device 100 determines a command to record has been received, the method 300 advances to block 306.

Figures 4, 5:
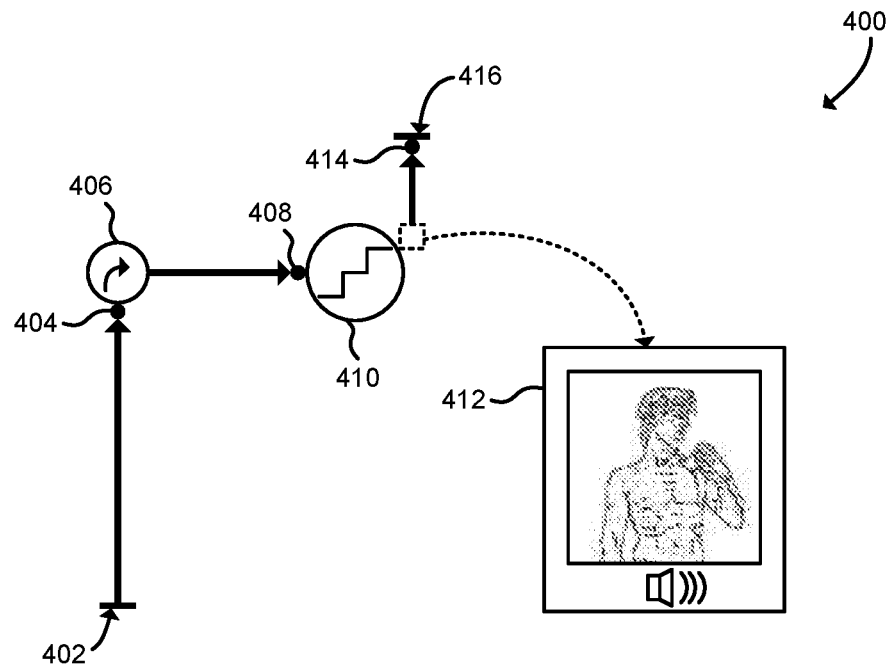
FIG. 4 is a simplified schematic diagram of an illustrative path recorded by the mobile computing device of FIGS. 1 and 2.
FIG. 5 is a simplified schematic diagram of illustrative path data that may be generated and processed for the illustrative path of FIG. 4.

In block 306, the mobile computing device 100 adds a starting waypoint to the path data 212. The starting waypoint is used as an initial reference point for the path and therefore may not be based on any particular data received from the local location sensors 134. For example, referring now to FIG. 4, diagram 400 shows an illustrative path that may be traveled by the user and recorded by the mobile computing device 100. Waypoint 402 identifies the starting waypoint, generated based on the user command to record a path. Referring to FIG. 5, a schematic diagram 500 shows illustrative path data 212 corresponding to the path shown in FIG. 4. The illustrative path data 212 includes an ordered list of waypoints. The waypoint 402—the starting waypoint—is thus the first entry in the path data 212. Referring back to FIG. 3A, in some embodiments, in block 308 the mobile computing device 100 may add a user reminder to the path data 212. As described in more detail below in connection with block 332, the user reminder may include any user-generated wayfinding information such as a description of the starting waypoint (e.g., "I parked in spot 312, level B").

In block 310, the mobile computing device 100 receives sensor data indicative of movement of the mobile computing device 100 from one or more of the local location sensors 134. That is, the sensor data describes one or more movements of the mobile computing device 100 in space. The mobile computing device 100 may receive data from any or all local location sensors 134 capable of generating data. In some embodiments, the mobile computing device 100 may receive sensor data from local location sensors 134 designated or authorized by the user, for example, from local location sensors 134 authorized by a user privacy policy. As described below, the sensor data may be used by the mobile computing device 100 to determine wayfinding information including length traveled from the previous waypoint, direction of travel, or elevation changes.

In some embodiments, in block 312, the mobile computing device 100 may receive sensor data from the motion sensor(s) 136. For example, the mobile computing device 100 may receive acceleration data from one or more accelerometers or rotational information from one or more gyroscopes. In some embodiments, in block 314, the mobile computing device 100 may receive sensor data from the compass 138. That sensor data may describe the orientation of the mobile computing device 100 with respect to magnetic north (e.g., north, south, east, and west). Additionally, in some embodiments, in block 316, the mobile computing device 100 may receive sensor data from the altimeter 140. That sensor data may describe the elevation of the mobile computing device 100.

In some embodiments, in block 318, in addition to sensor data received from the local location sensors 134, the mobile computing device 100 may receive signal strength data from the communication circuitry 128. For example, the mobile computing device 100 may receive signal strength data for a base station such as a wireless access point. Because wireless signal strength decreases with distance, the level and change in wireless signal strength may be used to determine the position and/or orientation of the mobile computing device 100 with respect to the base station. It should be apparent that in contrast with triangulation-based approaches, signal strength information may be collected for only a single base station. Additionally, it should be appreciated that the signal strength of a signal generated by a wireless access point may be monitored without actually connecting to the network hosted by the wireless access point. In that way, privacy of the user of the mobile computing device 100 may be maintained while using the wireless access point to supplement the wayfinding.

In block 320, the mobile computing device 100 determines whether the direction of movement of the mobile computing device 100 has changed. Such a change in direction may indicate that the user has turned a corner, changed elevation, veered to a new direction, or otherwise altered the path. Thus, a change in direction may cause the mobile computing device 100 to generate a new waypoint. To determine whether the direction has changed, the mobile computing device 100 may analyze the sensor data received from any of the local location sensors 134 and/or the signal strength data received from the communication circuitry 128. In some embodiments, the determined change in direction must be greater than a threshold level to prompt the determination of a new waypoint (e.g., the user must make a turn of greater than 45 degrees from the current path to produce the generation of a new waypoint). If the direction has not changed, the method 300 branches ahead to block 338, to determine whether to continue recording the path. If the direction has changed, the method 300 advances to block 322.

In block 322, the mobile computing device 100 generates a waypoint based on the received sensor data. A waypoint may represent a reference point along the path of the mobile computing device 100, and may be described in relative terms with respect to the previous waypoint (including the starting waypoint). The mobile computing device 100 may process the raw sensor data to generate movement data describing the waypoint, such as length traveled, direction of travel, or elevation change. Although illustrated as determining the movement data as the sensor data is received, in some embodiments the mobile computing device 100 may determine the movement data at another time, for example when determining directional instructions in the reverse direction as described in connection with block 350, below.

In some embodiments, in block 324 the mobile computing device 100 may determine the length traveled. The mobile computing device 100 may determine length traveled as the number of steps taken by the user based on data received from the motion sensor(s) 136. For example, the mobile computing device 100 may determine the length traveled by analyzing accelerometer data to count user steps, similar to a pedometer. Accordingly, the determined length may be an estimated length relative to the particular user of the mobile computing device 100 and thus may be less accurate for other persons.

In some embodiments, in block 326 the mobile computing device 100 may determine the direction of travel. In some embodiments, direction may be determined as an absolute direction based on data received from the compass 138. Additionally or alternatively, direction may be determined in relative terms based on data received from the motion sensor(s) 136, for example from a gyroscope. As still another example, direction may be determined relative to one or more base stations based on signal strength data received from the communication circuitry 128. In that example, when a decrease in signal strength is observed, the direction may be relatively "away" from the base station, and when an increase is observed the direction may be relatively "toward" the base station. Using signal strength data thus allows the mobile computing device 100 to determine relative direction when in contact with only one base station.

Additionally, in some embodiments, in block 328 the mobile computing device 100 may determine the elevation change. The mobile computing device 100 may determine the elevation change based on data received from the altimeter 140. In some embodiments, the mobile computing device 100 may determine the elevation change in terms of floors or stories, which may be more useful for indoor wayfinding than distance units such as feet or meters.

In block 330, the mobile computing device 100 adds the waypoint to the end of the path data 212. The mobile computing device 100 may store the derived directional information describing the relative position of the waypoint in the path data 212. Additionally or alternatively, the raw sensor data associated with the waypoint may be stored in the path data 212. The raw sensor data may be used by the mobile computing device 100 to derive, refine, or verify directional instructions in the reverse direction, as described below. The path data 212 may include additional information relating to the waypoint, such as the local location sensors 134 used to determine the waypoint. Adding the waypoint to the end of the path data 212 allows the path data 212 to capture the order of the user's path.

Referring now to FIGS. 4 and 5, as described above, the schematic diagram 400 shows an illustrative path and the schematic diagram 500 shows corresponding path data 212. The illustrative path data 212 describes the relative movement data for each waypoint, along with the local location sensors 134 used to generate the waypoint. As described above, the path starts at the starting waypoint 402. Next, a waypoint 404 describes a movement of "twenty steps north," captured using an accelerometer 136 and the compass 138. In that example, to generate waypoint 404 the mobile computing device 100 analyzed accelerometer data to determine that the user took twenty steps, similar to a pedometer. The mobile computing device 100 also analyzed magnetometer data indicating that the mobile computing device 100 traveled northward from the starting waypoint 402. Note that in the illustrative embodiment, each waypoint in illustrative path data 212 records movement data relative to the previous waypoint (e.g., the waypoint 404 records relative movement data from the waypoint 402, and so on). In other embodiments, the path data 212 may record relative movement data for travel to the previous waypoint (i.e., in the reverse direction), or record raw sensor data that does not include relative directional information.

As another example, a waypoint 406 describes a turn to the east, and was captured using the compass 138 and a gyroscope 136. As a third example, a waypoint 408 describes a movement of ten steps east, and was captured using the accelerometer 136, the compass 138, and signal strength information captured by the communication circuit 128. In that example, the signal strength information may have decreased over the ten recorded steps, indicating that the user has traveled away from a particular wireless access point. As described below, on the return trip, an increase in signal strength may confirm that the user has traveled in the correct direction back toward that wireless access point. As a fourth example, a waypoint 410 describes movement up one flight of stairs, and was captured using the accelerometer 136 and the altimeter 140. In that example, the altimeter 140 may have recorded data indicating the user's elevation increased by ten feet. Based on that elevation change, the mobile computing device 100 may have determined that the user traveled up one floor.

Referring back to FIG. 3A, in addition to adding the waypoint to the path data 212, the user may add a user reminder to the path data in block 332 in some embodiments. The user reminder may include any user-generated wayfinding information. For example, the user reminder may memorialize notable landmarks such as parking locations, building or room names, architectural features, or any other information provided by the user for wayfinding purposes. The user reminder may be stored as a waypoint in the path data 212 or associated with an existing waypoint in the path data 212, allowing the user reminder to be presented at a certain position along the path. The user reminder may be stored as text, multimedia, or any other suitable data format. In some embodiments, in block 334 the mobile computing device 100 may capture a voice reminder using the audio sensor 144. Additionally or alternatively, in some embodiments, in block 336 the mobile computing device 100 may capture a digital image using the camera 142. For example, referring again to FIGS. 4 and 5, a waypoint 412 is associated with a user reminder captured with the camera 142 and the audio sensor 144. In the illustrative example, the user captured a digital image of a distinctive statue along the user's path and captured a voice reminder that this waypoint is "Past the statue." Of course, the user reminder is flexible and may include any reminder recorded or otherwise generated by the user.

Referring back to FIG. 3A, in block 338, the mobile computing device 100 determines whether to stop recording the path. In some embodiments, the mobile computing device 100 may monitor for a user command to stop recording the path, for example, when the user's destination is reached. The mobile computing device 100 may provide a user interface to allow the user to indicate that the destination has been reached. For example, the mobile computing device 100 may present a touch interface on the display 130 to allow the user to stop recording the path, or the mobile computing device 100 may respond to voice commands. Because the user is not required to supply a pre-determined destination, the mobile computing device 100 may not analyze sensor data or otherwise perform any comparison to determine if the pre-determined destination has been reached. If the mobile computing device 100 determines not to stop recording, the method 300 loops back to block 310 to receive additional sensor data. If the mobile computing device 100 determines to stop recording, the method 300 advances to block 340.

In block 340, the mobile computing device 100 may store a last waypoint in the path data 212, indicating the end of the path. For example, referring again to FIGS. 4 and 5, a waypoint 416 is the last waypoint and indicates that the user has arrived at the destination. Accordingly, the path data 212 does not reference any of the local location sensors 134. In some embodiments, in block 342, the mobile computing device 100 may add a user reminder to the path data 212. The user reminder may include any user-generated wayfinding information, as described above in connection with block 332. After adding the last waypoint to the path data 212, the method 300 advances to block 344, shown in FIG. 3B.

Figure 3B:
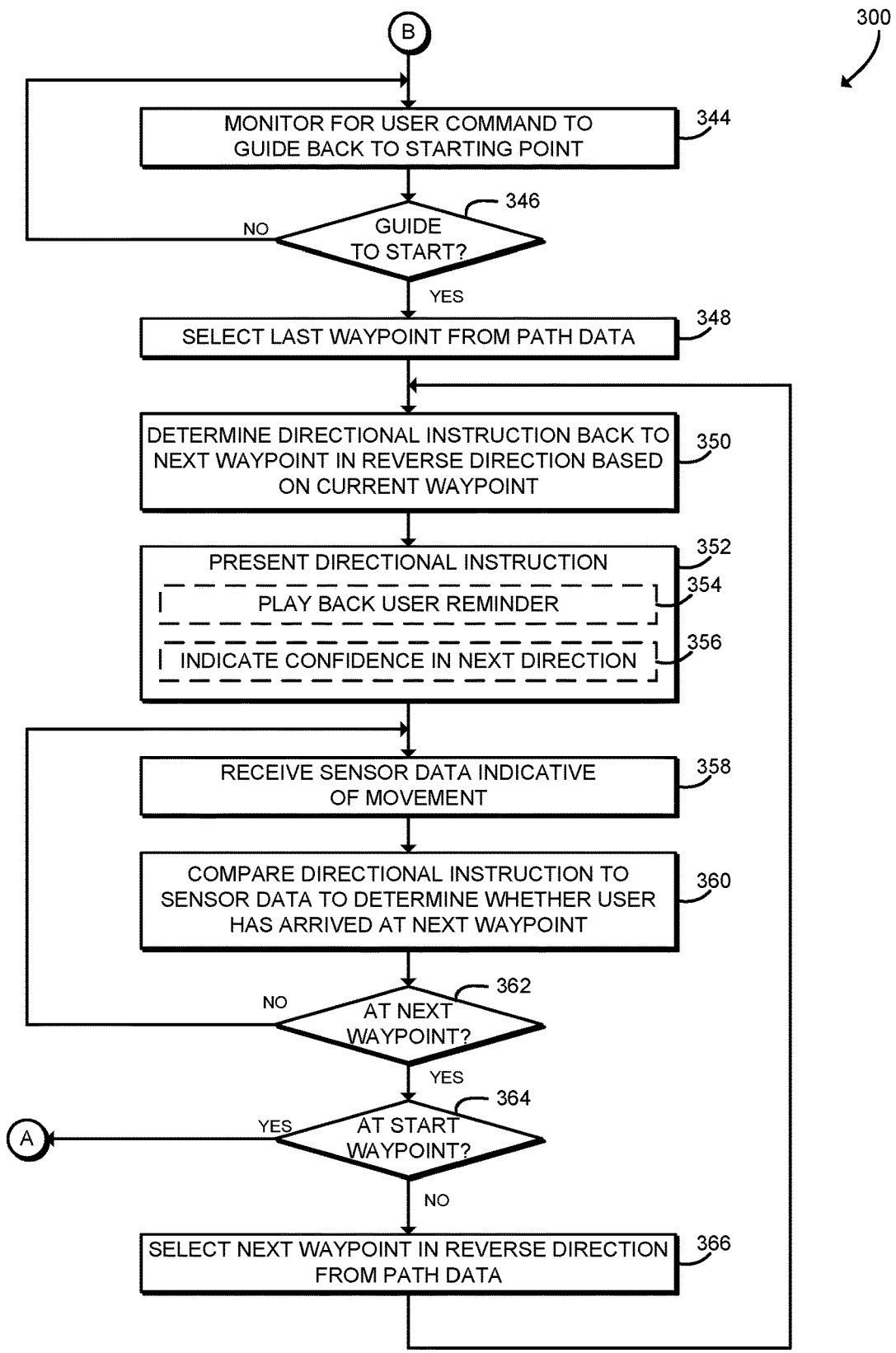

Referring now to FIG. 3B, in block 344, the mobile computing device 100 monitors for a user command to guide the user back to the starting point. Before commanding the mobile computing device 100 to return to the starting point, the user may remain at the destination location for some time, or may even travel to another location. As described above, the user may command the mobile computing device 100 through any mode of interaction. For example, the user may interact with touch screen controls on the display 130 of the mobile computing device 100, or utter a spoken command to the mobile computing device 100. In block 346, the mobile computing device 100 determines whether to begin guiding the user back to the starting point. If no command has been received, the method 300 loops back to block 344 to continue monitoring for user commands. If commanded to guide the user, the method 300 advances to block 348. Additionally or alternatively, in some embodiments (not illustrated), prior to guiding the user back to the starting point, the mobile computing device 100 may load path data 212 describing a path that has been recorded by another device or at another time. For example, a user may receive path data 212 sent by a friend who is already at the destination location. As another example, the received path data 212 may describe a location of interest such as a landmark, geocache, or other location designated by a third party.

In block 348, the mobile computing device 100 selects the last waypoint from the path data 212. The mobile computing device 100 selects the last waypoint in order to follow the path in reverse order, from most recent waypoint to the oldest waypoint. For example, referring again to FIGS. 4 and 5, the mobile computing device 100 may select the waypoint 416 as the current waypoint.

In block 350 of FIG. 3B, the mobile computing device 100 determines a directional instruction to the next waypoint in the reverse direction from the current waypoint. In other words, the directional instruction, if followed, will guide the user along the path in the reverse direction from the present location to the next waypoint. To determine the directional instruction, the mobile computing device 100 may reverse the sense of any directional information stored in the waypoint. For example, referring again to FIGS. 4 and 5, starting at the last waypoint 416, the directional instruction may simply direct the user to return to the ending point of the path. Of course, the last waypoint 416 may be treated as a special case, because the last waypoint 416 may be generated by a user command to stop recording when the user has reached the destination. Continuing the example, for the waypoint 414, the mobile computing device 100 may determine a directional instruction to guide the user to the waypoint 412. The mobile computing device 100 may determine that directional instruction to be "five steps south," converting the direction from south to north. As a further example, for the waypoint 410, the mobile computing device 100 may determine the directional instruction to be "down 1 flight," converting the direction from up to down to guide the user back to the waypoint 408. As an additional example, for waypoint 406, the mobile computing device 100 may determine the directional instruction to be "turn south," converting the direction from east to south to guide the user back to the waypoint 404. Of course, as described above in some embodiments the waypoints may be stored in the path data 212 in their reversed sense and therefore may not be doubly reversed. Additionally or alternatively, the directional instruction may be determined based on raw sensor data stored in the path data 212. To determine the directional instruction based on raw sensor data, the mobile computing device 100 may perform similar analysis to that described above in connection with block 322 of FIG. 3A.

In block 352 of FIG. 3B, the mobile computing device 100 presents the directional instruction to the user. For example, the mobile computing device 100 may display a textual or graphical instruction on the display 130, output a spoken instruction using the audio device 132, or present the instruction using any other available mode of user interaction. The mobile computing device 100 may present the directional instruction alone, for example by displaying a distance and direction, or may present the directional instruction in the context of the entire path, for example by displaying a complete route map. In some embodiments, in block 354 the mobile computing device 100 may play back a previously recorded user reminder associated with the directional instruction. For example, referring again to FIGS. 4 and 5, for waypoint 412, the mobile computing device 100 may display the digital image previously captured by the user and play back the voice reminder recorded by the user. Referring back to FIG. 3B, in block 356 in some embodiments the mobile computing device 100 may indicate a confidence level associated with the directional instruction. For example, the mobile computing device 100 may indicate a high confidence level when the directional instruction was generated based on data from a large number of local location sensors 134, a medium confidence level when the directional information was generated based on an acceptable but not large number of local location sensors 134, and a low confidence level when the directional information was generated based on conflicting sensor data or from an undesirably small number of local location sensors 134. The confidence level may be indicated textually, graphically, by color-coding, or by any other available technique.

In block 358, the mobile computing device 100 receives sensor data indicative of movement of the mobile computing device 100 from one or more of the local location sensors 134. The mobile computing device 100 may receive data from any or all local location sensors 134 capable of generating data, as described above in connection with block 310. In some embodiments, the mobile computing device 100 may receive sensor data from local location sensors 134 designated or authorized by the user, for example, from local location sensors 134 authorized by a user privacy policy. As described above, the path data 212 may have been previously generated using sensor data from those local location sensors 134.

In block 360, the mobile computing device 100 compares the directional instruction currently being presented to the user with the received sensor data, to determine if the mobile computing device 100 has arrived at the next waypoint. For example, for the waypoint 414 shown in FIGS. 4 and 5, the mobile computing device 100 may monitor data from the accelerometer 136 and the compass 138 to determine whether the user has completed five steps south and thus arrived at waypoint 412. As another example, for the waypoint 410, the mobile computing device 100 may monitor data from the altimeter 140 and the accelerometer 136 to determine whether the user has traveled down one flight of stairs and arrived at the waypoint 408. As a third example, for the waypoint 408, the mobile computing device 100 may monitor data from the accelerometer 136, compass 138, and signal strength information from the communication circuit 128 to determine whether the user has traveled ten steps west and arrived at the waypoint 406. In that example, consider that the signal strength was initially observed to decrease when traveling from the waypoint 406 to the waypoint 408. In that example, on the return trip the mobile computing device 100 may determine whether the signal strength has increased.

Additionally or alternatively, the mobile computing device 100 may determine if the directional instruction is complete by receiving a command from the user (not shown). For example, the mobile computing device 100 may provide a user interface command on the display 130 to allow the user to manually advance through the directional instructions. Manual control may be particularly appropriate for presentation of user reminders; however, manual control may be used for any of the directional instructions.

In block 362, the mobile computing device 100 determines whether the mobile computing device 100 has arrived at the next waypoint. If not, the method 300 loops back to block 358 to continue monitoring sensor data. If the mobile computing device 100 has arrived at the next waypoint, the method 300 advances to block 364.

In block 364, the mobile computing device 100 determines whether the mobile computing device 100 has arrived at the start waypoint. If at the start waypoint, the user has successfully completed wayfinding back to the start of the path. For example, referring to FIGS. 4 and 5, the mobile computing device 100 may determine whether the mobile computing device 100 has arrived at the waypoint 402. If the mobile computing device 100 has arrived at the start waypoint, the method 300 loops back to block 302, shown in FIG. 3A, to monitor for user commands to record additional paths. If the mobile computing device 100 has not arrived at the start waypoint, the method 300 advances to block 366.

In block 366, the mobile computing device 100 selects the next waypoint in the reverse direction from the path data 212. For example, referring again to FIGS. 4 and 5, for waypoint 416 the mobile computing device 100 selects waypoint 414, for waypoint 414 the mobile computing selects waypoint 412, and so on. After selecting the next waypoint, the method 300 loops back to block 350 to determine and present the next directional instruction to the user.

EXAMPLES

Example 1 includes a mobile computing device for directional wayfinding, the mobile computing device comprising one or more local location sensors to generate sensor data indicative of movement of the mobile computing device; a data capture module to receive first sensor data from the one or more local location sensors, the first sensor data indicative of movement of the mobile computing device from a first waypoint; a waypoint determination module to (i) determine a second waypoint based on the first sensor data and (ii) determine a directional instruction to guide a user of the mobile computing device from the second waypoint to the first waypoint; and a user interface module to present the directional instruction to the user.

Example 2 includes the subject matter of Example 1, and wherein to determine the second waypoint comprises to: determine whether a direction of the movement of the mobile computing device has changed based on the first sensor data; and generate the second waypoint in response to a determination that the direction of the movement of the mobile computing device has changed.

Example 3 includes the subject matter of any of Examples 1 and 2, and wherein to determine the second waypoint comprises to determine movement data that defines a length and a direction of a path from the first waypoint to the second waypoint.

Example 4 includes the subject matter of any of Examples 1-3, and wherein the one or more local location sensors comprises a motion sensor to generate motion sensor data; and to determine the length of the path comprises to determine a number of steps based on the motion sensor data.

Example 5 includes the subject matter of any of Examples 1-4, and wherein the motion sensor comprises an accelerometer or a gyroscope.

Example 6 includes the subject matter of any of Examples 1-5, and wherein the one or more local location sensors comprises a magnetometer to generate magnetometer sensor data; and to determine the direction of the path comprises to determine a direction based on the magnetometer sensor data.

Example 7 includes the subject matter of any of Examples 1-6, and wherein the one or more local location sensors comprises a gyroscope to generate gyroscope sensor data; and to determine the direction of the path comprises to determine a direction based on the gyroscope sensor data.

Example 8 includes the subject matter of any of Examples 1-7, and wherein the one or more local location sensors comprises an altimeter to generate altimeter sensor data; and to determine the length of the path comprises to determine an elevation change based on the altimeter data.

Example 9 includes the subject matter of any of Examples 1-8, and further comprising a wireless network interface, wherein the data capture module is further to receive third sensor data from the wireless network interface, the third sensor data being indicative of a wireless signal strength; and to determine the second waypoint comprises to determine movement data that defines a length and a direction of a path from the first waypoint to the second waypoint based on the first sensor data and the third sensor.

Example 10 includes the subject matter of any of Examples 1-9, and wherein the data capture module is further to record a user reminder from the user of the mobile computing device; to determine the directional instruction comprises to determine the directional instruction based on the user reminder; and to present the directional instruction comprises to present the user reminder.

Example 11 includes the subject matter of any of Examples 1-10, and wherein the waypoint determination module is further to associate the user reminder with one of the first waypoint or the second waypoint.

Example 12 includes the subject matter of any of Examples 1-11, and wherein the user reminder comprises an audio reminder.

Example 13 includes the subject matter of any of Examples 1-12, and wherein the user reminder comprises a digital image.

Example 14 includes the subject matter of any of Examples 1-13, and wherein to present the directional instruction comprises to present an indication of a confidence level associated with the directional instruction, the confidence level based on a total number of sensors used to determine the directional instruction.

Example 15 includes the subject matter of any of Examples 1-14, and wherein the user interface module is further to (i) receive a first command from the user of the mobile computing device to record the path and (ii) receive a second command from the user to guide the user along the path in the reverse direction; to receive the first sensor data comprises to receive the first sensor data in response to receipt of the first command; and to present the directional instruction comprises to present the directional instruction in response to receipt of the second command.

Example 16 includes the subject matter of any of Examples 1-15, and wherein the data capture module is further to receive second sensor data from the one or more local location sensors in response to presentation of the directional instruction, the second sensor data being indicative of a second movement of the mobile computing device from the second waypoint; and the waypoint determination module is further to determine whether the mobile computing device has arrived at the first waypoint based on the second sensor data.

Example 17 includes the subject matter of any of Examples 1-16, and wherein the directional instruction comprises a first directional instruction; the data capture module is further to receive third sensor data from the one or more local location sensors, the third sensor data being indicative of movement of the mobile computing device from a third waypoint; the waypoint determination module to (i) determine the first waypoint based on the third sensor data and (ii) determine a second directional instruction to guide the user from the first waypoint to the third waypoint; and the user interface module is further to present the second directional instruction to the user in response to a determination that the mobile computing device has arrived at the first waypoint.

Example 18 includes a method for directional wayfinding, the method comprising receiving, by a mobile computing device, first sensor data from one or more local location sensors of the mobile computing device, the first sensor data being indicative of movement of the mobile computing device from a first waypoint; determining, by the mobile computing device, a second waypoint based on the first sensor data; determining, by the mobile computing device, a directional instruction to guide a user of the mobile computing device from the second waypoint to the first waypoint; and presenting, by the mobile computing device, the directional instruction to the user.

Example 19 includes the subject matter of Example 18, and wherein determining the second waypoint comprises determining whether a direction of the movement of the mobile computing device has changed based on the first sensor data; and generating the second waypoint in response to determining the direction of the movement of the mobile computing device has changed.

Example 20 includes the subject matter of any of Examples 18 and 19, and wherein determining the second waypoint comprises determining movement data defining a length and a direction of a path from the first waypoint to the second waypoint.

Example 21 includes the subject matter of any of Examples 18-20, and wherein receiving the first sensor data comprises receiving motion sensor data from a motion sensor of the mobile computing device; and determining the length of the path comprises determining a number of steps based on the motion sensor data.

Example 22 includes the subject matter of any of Examples 18-21, and wherein receiving the motion sensor data comprises receiving sensor data from an accelerometer or a gyroscope.

Example 23 includes the subject matter of any of Examples 18-22, and wherein receiving the first sensor data comprises receiving magnetometer sensor data from a magnetometer of the mobile computing device; and determining the direction of the path comprises determining a direction based on the magnetometer sensor data.

Example 24 includes the subject matter of any of Examples 18-23, and wherein receiving the first sensor data comprises receiving gyroscope sensor data from a gyroscope of the mobile computing device; and determining the direction of the path comprises determining a direction based on the gyroscope sensor data.

Example 25 includes the subject matter of any of Examples 18-24, and wherein receiving the first sensor data comprises receiving altimeter sensor data from an altimeter of the mobile computing device; and determining the length of the path comprises determining an elevation change based on the altimeter data.

Example 26 includes the subject matter of any of Examples 18-25, and further comprising receiving, by the mobile computing device, third sensor data from a wireless network interface of the mobile computing device, the third sensor data being indicative of a wireless signal strength; wherein determining the second waypoint comprises determining movement data defining a length and a direction of a path from the first waypoint to the second waypoint based on the first sensor data and the third sensor.

Example 27 includes the subject matter of any of Examples 18-26, and further comprising recording, by the mobile computing device, a user reminder from the user of the mobile computing device; wherein determining the directional instruction comprises determining the directional instruction based on the user reminder; and wherein presenting the directional instruction comprises presenting the user reminder.

Example 28 includes the subject matter of any of Examples 18-27, and further comprising associating, by the mobile computing device, the user reminder with one of the first waypoint or the second waypoint.

Example 29 includes the subject matter of any of Examples 18-28, and wherein recording the user reminder comprises recording an audio reminder.

Example 30 includes the subject matter of any of Examples 18-29, and wherein recording the user reminder comprises capturing a digital image.

Example 31 includes the subject matter of any of Examples 18-30, and wherein presenting the directional instruction comprises presenting an indication of a confidence level associated with the directional instruction, the confidence level based on a total number of sensors used to determine the directional instruction.

Example 32 includes the subject matter of any of Examples 18-31, and further comprising receiving, by the mobile computing device, a first command from the user of the mobile computing device to record the path; and receiving, by the mobile computing device, a second command from the user to guide the user along the path in the reverse direction; wherein receiving the first sensor data comprises receiving the first sensor data in response to receiving the first command; and wherein presenting the directional instruction comprises presenting the directional instruction in response to receiving the second command.

Example 33 includes the subject matter of any of Examples 18-32, and further comprising receiving, by the mobile computing device, second sensor data from the one or more local location sensors in response to presenting the directional instruction, the second sensor data being indicative of a second movement of the mobile computing device from the second waypoint; and determining, by the mobile computing device, whether the mobile computing device has arrived at the first waypoint based on the second sensor data.

Example 34 includes the subject matter of any of Examples 18-33, and wherein the directional instruction comprises a first directional instruction, the method further comprising receiving, by the mobile computing device, third sensor data from the one or more local location sensors of the mobile computing device, the third sensor data being indicative of movement of the mobile computing device from a third waypoint; determining, by the mobile computing device, the first waypoint based on the third sensor data; determining, by the mobile computing device, a second directional instruction to guide the user from the first waypoint to the third waypoint; and presenting, by the mobile computing device, the second directional instruction to the user in response to determining that the mobile computing device has arrived at the first waypoint.

Example 35 includes a computing device comprising a processor; and a memory having stored therein a plurality of instructions that when executed by the processor cause the computing device to perform the method of any of Examples 18-34.

Example 36 includes one or more machine-readable storage media comprising a plurality of instructions stored thereon that in response to being executed result in a computing device performing the method of any of Examples 18-34.

Example 37 includes a computing device comprising means for performing the method of any of Examples 18-34.

The invention claimed is:

1. A mobile computing device for directional wayfinding, the mobile computing device comprising:
 a first set of location sensors to generate first sensor data, the first sensor data to indicate movement of the mobile computing device from a first waypoint to a second waypoint;
 a second set of location sensors to generate second sensor data, the second set of location sensors different from the first set of location sensors, the second sensor data to indicate movement from the second waypoint to a third waypoint;
 a display; and
 at least one processor to:
  (i) determine the second waypoint based on the first sensor data,
  (ii) determine a first directional instruction to guide a user of the mobile computing device from the second waypoint back to the first waypoint based on the first sensor data,
  (iii) determine a first confidence level for the first directional instruction based on a first number of sensors in the first set of the location sensors, (iv) determine the third waypoint based on the second sensor data, (v) determine a second directional instruction to guide the user from the third waypoint back to the second waypoint based on the second sensor data, (vi) determine a second confidence level for the second directional instruction based on a second number of sensors in the second set of the location sensors, and (vii) cause the display to present at least one of: (a) the first directional instruction and the first confidence level, or (b) the second directional instruction and the second confidence level.

2. The mobile computing device of claim 1, wherein the at least one processor is to determine the first confidence level at a first level when the first number of sensors in the first set of location sensors is a first amount and to determine the second confidence level at a second level when the second number of sensors in the second set of location sensors is a second amount, the first level higher than the second level and the first amount larger than the second amount.

3. The mobile computing device of claim 1, wherein the first sensor data includes at least one of: (i) motion sensor data from a motion sensor, (ii) magnetometer sensor data from a magnetometer, or (iii) altimeter sensor data from an altimeter, and wherein the at least one processor is to determine the first directional instruction based on at least one of: (i) a number of steps from the second waypoint back to the first waypoint based on the motion sensor data, (ii) a direction of a path from the second waypoint back to the first waypoint based on the magnetometer sensor data, or (iii) a length of the path from the second waypoint back to the first waypoint based on the altimeter sensor data.

4. The mobile computing device of claim 1, wherein the at least one processor is to at least one of cause the display to present a picture captured by the user at the first waypoint or cause an output device to output a voice recording of the user captured by the user at the first waypoint.

5. A method for directional wayfinding between a first waypoint, a second waypoint, and a third waypoint, the method comprising:

determining, by executing instructions with at least one processor, the second waypoint based on first sensor data, the first sensor data indicative of movement of a mobile computing device from the first waypoint to the second waypoint, the first sensor data corresponding to a first set of location sensors;

determining, by executing instructions with the at least one processor, a first directional instruction to guide a user of the mobile computing device from the second waypoint back to the first waypoint based on the first sensor data;

determining, by executing instructions with the at least one processor, a first confidence level for the first directional instruction based on a first number of sensors in the first set of location sensors;

determining, by executing instructions with the at least one processor, the third waypoint based on second sensor data, the second sensor data indicative of movement of the mobile computing device from the second waypoint to the third waypoint, the second sensor data corresponding to a second set of location sensors, the first set of location sensors different from the second set of location sensors;

determining, by executing instructions with the at least one processor, a second directional instruction to guide the user from the third waypoint back to the second waypoint based on the second sensor data;

determining, by executing instructions with the at least one processor, a second confidence level for the second directional instruction based on a second number of sensors in the second set of location sensors; and causing, by executing instructions with the at least one processor, a display to present at least one of: (a) the first directional instruction and the first confidence level, or (b) the second directional instruction and the second confidence level.

6. The method of claim 5, further including determining, by executing instructions with the at least one processor, the first confidence level at a first level when the first number of sensors in the first set of location sensors is a first amount and determining, by executing instructions with the at least one processor, the second confidence level at a second level when the second number of sensors in the second set of location sensors is a second amount, the first level higher than the second level and the first amount larger than the second amount.

7. The method of claim 5, wherein the first sensor data includes at least one of (i) motion sensor data from a motion sensor, (ii) magnetometer sensor data from a magnetometer, or (iii) altimeter sensor data from an altimeter, and determining the first directional instruction is based on at least one of (i) a number of steps from the second waypoint back to the first waypoint based on the motion sensor data, (ii) a direction of a path from the second waypoint back to the first waypoint based on the magnetometer sensor data, or (iii) a length of the path from the second waypoint back to the first waypoint based on the altimeter sensor data.

8. The method of claim 5, further including at least one of causing, by executing instructions with the at least one processor, the display to present a picture captured by the user at the first waypoint or causing, by executing instructions with the at least one processor, an output device to output a voice recording of the user captured by the user at the first waypoint.

9. One or more non-transitory, computer-readable storage media comprising a plurality of instructions that, when executed, cause at least one processor of a mobile computing device to:

determine a second waypoint based on first sensor data, the first sensor data indicative of movement of the mobile computing device from a first waypoint to the second waypoint, the first data output by a first set of location sensors;

determine a first directional instruction to guide a user of the mobile computing device from the second waypoint back to the first waypoint based on the first sensor data;

determine a first confidence level for the first directional instruction based on a first number of sensors in the first set of location sensors;

determine a third waypoint based on second sensor data, the second sensor data indicative of movement of the mobile computing device from the second waypoint to the third waypoint, the second sensor data output by a second set of location sensors, the first set of location sensors different from the second set of location sensors;

determine a second directional instruction to guide the user from the third waypoint back to the second waypoint based on the second sensor data;

determine a second confidence level for the second directional instruction based on a second number of sensors in the second set of location sensors; and cause a display to present at least one of: (a) the first directional instruction and the first confidence level, or (b) the second directional instruction and the second confidence level.

10. The one or more non-transitory, computer-readable storage media of claim 9, wherein the instructions, when executed, cause the at least one processor to determine the first confidence level at a first level when the first number of sensors in the first set of location sensors is a first amount and to determine the second confidence level at a second level when the second number of sensors in the second set of location sensors is a second amount, the first level higher than the second level and the first amount larger than the second amount.

11. The one or more non-transitory, computer-readable storage media of claim 9, wherein the first sensor data includes at least one of (i) motion sensor data from a motion sensor, (ii) magnetometer sensor data from a magnetometer, or (iii) altimeter sensor data from an altimeter, wherein the instructions, when executed, cause the at least one processor to determine the first directional instruction based on at least one of (i) a number of steps from the second waypoint back to the first waypoint based on the motion sensor data, (ii) a direction of a path from the second waypoint back to the first waypoint based on the magnetometer sensor data, or (iii) a length of the path from the second waypoint back to the first waypoint based on the altimeter sensor data.

12. The one or more non-transitory, computer-readable storage media of claim 9, wherein the instructions, when executed, cause the at least one processor to at least one of cause the display to present a picture captured by the user at the first waypoint or cause an output device to output a voice recording of the user captured by the user at the first waypoint.

\* \* \* \* \*